July 21, 1970  R. H. NELSON  3,521,125
ELECTROSTATIC CROP DUSTING APPARATUS
Filed Jan. 16, 1967  2 Sheets-Sheet 1

INVENTOR
Robert H. Nelson

BY Stevens, Davis, Miller & Mosher
ATTORNEYS

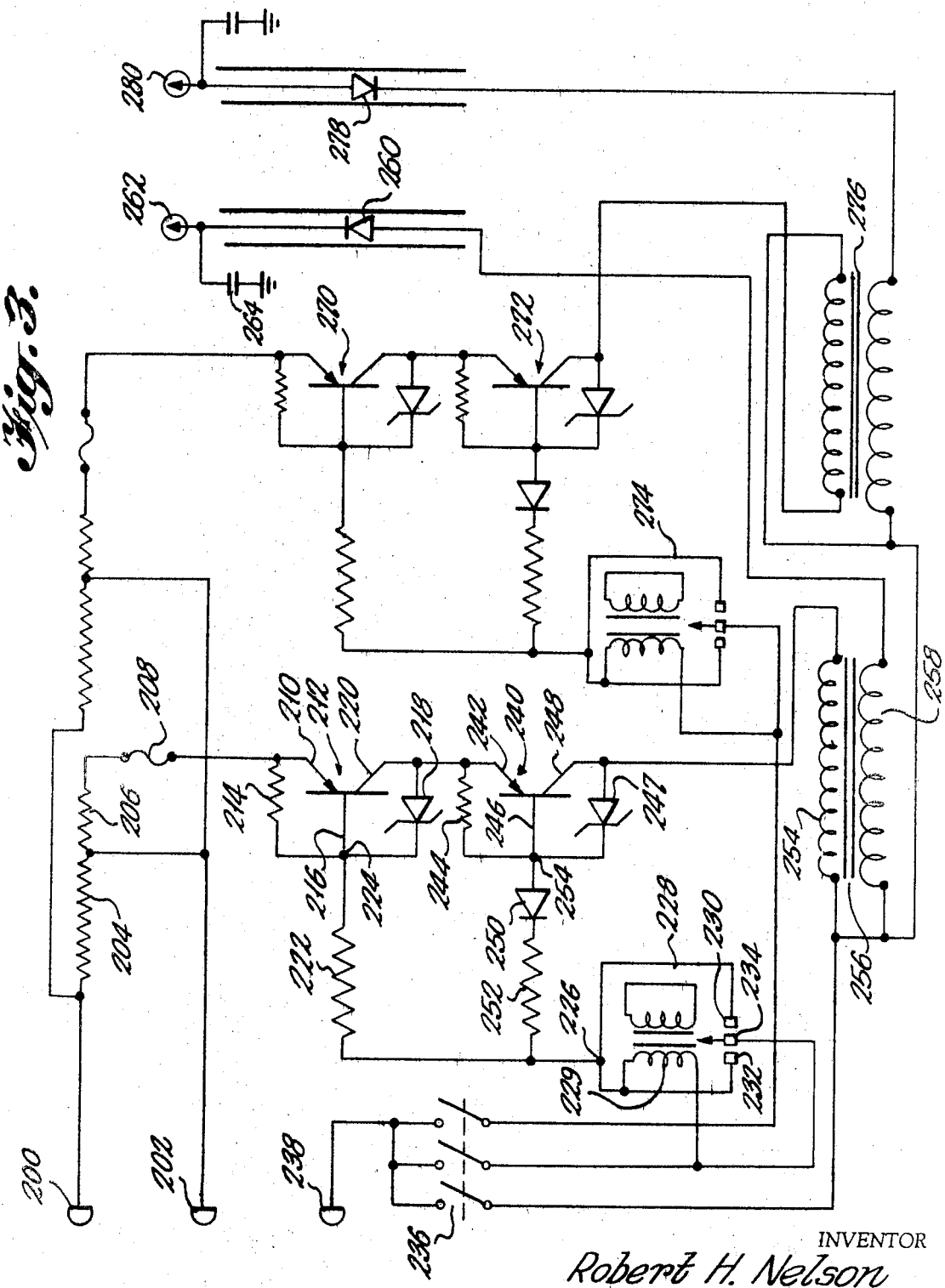

United States Patent Office 3,521,125
Patented July 21, 1970

3,521,125
ELECTROSTATIC CROP DUSTING APPARATUS
Robert H. Nelson, 4500 W. 2nd Ave.,
Amarillo, Tex. 79106
Filed Jan. 16, 1967, Ser. No. 609,589
Int. Cl. B05b 5/00, 5/04
U.S. Cl. 317—3
13 Claims

ABSTRACT OF THE DISCLOSURE

The patent specification and drawings disclose an electrostatic charging apparatus for placing a charge on crop dusting material. Dusting material is fed into an ionization chamber by an air stream flow where it is ionized by the charge across a pair of high voltage electrodes, which are made plus and minus with respect to ground. By providing a charge across the positive and negative electrodes, the need for an apparatus ground is eliminated. In an electrostatic charging apparatus for placing a charge of crop dusting material, the dusting material is fed into an ionization chamber by air stream flow where the air is ionized by the voltage across a pair of high voltage electrodes. A power supply provides a high positive voltage to one of the electrodes with respect to ground and a high negative voltage to the other electrodes with respect to ground. The positive electrode surrounds the negative electrode and the air stream flows over the positive electrode at a high rate shielding it from the crop dusting material introduced into the chamber. The surface of the positive electrode is curved in the form of an air foil to increase the velocity of the air stream flowing over the positive electrode.

BACKGROUND OF THE INVENTION

The present invention relates to an electro-static particle charging apparatus and more particularly to electro-static dusting or spraying ionization chambers having a power supply to provide a negative and positive output to eliminate grounding of the ionization chamber.

Dusting crops with chemicals for the purpose of eradicating various types of parasites has become conventional practice in modern farming methods. This dusting is generally done by air or with large farm equipment. Since the process is relatively expensive, it is desirable that as little as possible of the crop dusting material be wasted. To increase its adhereability, a static charge is placed on the dusting material in order that it be attracted and adhere to the plants of opposite or lower polarity. This attraction enables coating of the plant with a thin layer of chemical dusting material on all leaf surfaces.

The dusting material is charged by passing it through a charging or ionization chamber which is electrostatically charged by a high D.C. potential. In conventional devices a high DC voltage is fed into an ionization chamber which produces an ionized field within the chamber. As the dusting material passes through the chamber, it is given a high positive or negative charge. The dusting material is then attracted to plants of opposite or lower polarity to insure uniform coating.

Prior art electro-static crop dusting apparatus have ionization chambers which are grounded to the frame. With apparatus of this type, the frame tends to build up to the same high DC potential as the ionization chamber power source by means of static induction. This then neutralizes the static function of the ionization chamber and the crop dusting material no longer is charged.

SUMMARY OF THE INVENTION

The present invention relates to an electro-static crop dusting ionization chamber adapted to overcome the disadvantages of the prior art grounded devices. Neither electrode of the ionization chamber is grounded to earth on the frame of the vehicle carrying the chamber, but is connected to electrical potential source of opposite polarities. This eliminates the tendency for potential on the frame to build up by static induction. Thus, a constant difference in potential is maintained between the ionization chamber electrodes to insure that the dusting material passing through the chamber is properly charged and ionized. The ionization chamber includes a venturi type construction to facilitate the flow of air and the charged crop dusting particles through the chamber to the atmosphere. One construction includes a cylinder type venturi while a second construction utilizes a fish-tail type venturi. One electrode has the form of an air foil to prevent coating of the electrode with oppositely charged dust particles.

The potential difference is provided by a D.C. power supply having both a positive and negative high voltage output which is coupled to the ionization chamber. The power supply includes a positive and negative circuit. Each circuit is connected to a power supply source which energizes a 115 c.p.s. chopper to produce a square wave output through a pair of base fired transistors to a high voltage transformer. The output of the transformer is rectified by a selenium rectifier to produce either a positive or negative output depending upon the polarity of the rectifier.

Among the objects of the present invention are the provision of an electro-static dust charging apparatus having an improved and more effective electro-static ionization chamber; to provide an electro-static dust charging apparatus in which neutralizing of the static function of the ionization chamber by static induction is prevented; and to provide an electro-static dust charging apparatus having a power supply adapted to provide both a positive and negative high potential output.

Other objects and further scope of applicability of the present invention will become apparent from the detailed description to follow, taken in conjunction with the accompanying drawings described below.

BRIEF DESCRIPTION OF THE DRAWINGS

FIG. 1 is a schematic view of a cylinder type venturi ionization chamber; FIG. 2 is an illustration of a fan or fish-tail type venturi ionization chamber of the present invention; and FIG. 3 is a circuit diagram of the power supply unit of the present invention.

DESCRIPTION OF THE PREFERRED EMBODIMENTS

FIG. 1 illustrates an electro-static ionization chamber for ionizing dusting materials used with crop spraying equipment. An air stream is directed through an air stream duct 2 from a source such as a fan or the like (not shown). A venturi tube 4 mounted in any convenient manner within the duct is provided with a dusting material inlet 6 which is connected to a source of chemical dusting material (not shown). A power supply 8, which will be described below in greater detail, provides both a high positive and negative potential output. The negative output terminal 10 is coupled from the power supply unit 8 to the venturi tube 4 where it terminates in an elongated L shaped electrode 12. The electrode 12 is mounted on the venturi tube 4 by means of a grommet 14 so that it is positioned to point substantially parallel to the air stream flow through the venturi tube 4. The positive terminal 16 of the power supply 8 is connected to a positive electrode 18 on the air stream duct 2 by means of connector 20. The positive electrode 18 comprises a tapered funnel shaped element which is connected to the air stream duct 2 in such a manner that it surrounds the outlet of the venturi tube and passes the air stream from the venturi tube 4 through the funnel shaped positive electrode 18.

With the power supply 8 turned on, a high negative potential is applied to the negative electrode 12 and a high positive potential is applied to the positive electrode 18 to create a potential difference and an electro-static field. With an air stream flowing in the air stream duct 2, air flows past the venturi tube 4 and electrodes 12 and 18 to the atmosphere. Chemicals or other suitable dusting materials are supplied to the venturi tube 4 through the dust inlet 6 where they are mixed with the air stream and carried by the air stream flow past the negative electrode 12 which gives the dusting material particles a negative charge. The negatively charged dusting material particles are carried past the positive electrode 18 before they can come in contact with its cylinder surface, which is shielded by the high velocity air flowing around the venturi tube 4 and over the surface of the cylinder 18. Furthermore, the positive electrode cylinder 18 is designed somewhat like an air foil so that in the area where the greatest electrostatic field exists, the air stream is at its greatest velocity and lowest pressure and a lifting force comparable to a vacuum is developed above the cylinder surface acting to remove any dust particles that may have come in contact with the cylinder surface. Since the electrode cylinder 18 is connected to a positive potential source instead of being grounded to the frame of the vehicle carrying the apparatus or earth there is no tendency for a potential build up due to static induction resulting in neutralization of the ionization chamber.

FIG. 2 illustrates a fan or fish-tail type venturi ionization chamber and includes an air stream duct 52, which gradually tapers in a first-tail section 54 to form an elongated rectangular opening 56, through which the air and dusting materials are discharged. A smaller fish-tail shaped venturi tube 58 is placed within the larger fish-tail section 54 in a manner similar to the venturi tube of FIG. 1 so that the air stream will flow through the venturi tube 58 and around it within the fish-tail section 54. A dusting material inlet 60 is provided to feed the dusting chemicals directly into the fish-tail venturi tube 58. A power supply unit 62 is adapted to produce a high positive and a high negative output. The high voltage negative output terminal 63 is connected from the power supply unit 62 to a rod element 64 which is used as the negative electrode. The rod element 64 is positioned directly in front of the rectangular opening 56 of the fish-tail venturi tube 58. The negative rod electrode 64 is mounted on insulating blocks 68 and 70 which in turn are secured to the fish-tail section 54 of the air stream duct 52. The high voltage positive output of the terminal 71 of power supply 12 is connected to two rectangular plates which serve as positive electrodes 72 and 74. These positive electrodes 72 and 74 are secured to the fish-tail section 54 of the air stream duct 52 and each include a raised contoured surface 76 which projects into the air stream.

Dusting material is supplied to the fish-tail venturi tube 58 through the inlet tube 60, and it is carried through the venturi tube 58 by means of the air stream flow. As the dusting material emerges from the venturi tube 58 it passes by the high potential negative electrode 64 which imparts a negative charge on the dust particles. The velocity of the air stream flow is sufficient to carry the negatively charged particles past the positive electrodes 72 and 74 and the contoured surfaces 76 act as an air foil to increase the air stream velocity as it passes over the electrodes 72 and 74. The charged particles are carried out of the charging chamber into the atmosphere where they fall onto the plants to be treated as described hereinabove. Because the positive high voltage output of the power supply 62 is connected to the positive electrode plates 72 and 74 instead of being grounded to the frame the tendency of the frame and the electrodes 72 and 74 to build up to the same DC potential as the negative electrode 64 by means of static induction is eliminated.

FIG. 3 illustrates the circuit diagram of the power supply unit used with the electro-static particle charging apparatus of the present invention. As indicated above, the power supply unit operates to provide both a positive and a negative high voltage potential. In order to provide both a positive and negative output, two circuit loops of the same configuration are provided, the only difference being in the polarity of the output rectifier. In order to facilitate the description of the power supply circuit only one of the circuit loops will be described. However, it will be appreciated that the second loop is identical to the first and differs only in the connection of the output rectifier.

The positive side of a 12 volt conventional DC battery source (not shown) may be connected to a terminal 200 of the circuit or the positive side of a 6 volt battery may be connected to a terminal 202 of the circuit. Two current limiting resistors 204 and 206 are connected between the 12 volt terminal 200 and a fuse 208. The circuit connection from the 6 volt terminal 202 to the fuse 208 only includes the resistor 206. The fuse 208 is coupled to the emitter 210 of a transistor 212. A resistor 214 is connected between the emitter 210 and the base 216 of transistor 212. A Zener diode 218 is connected between the collector 220 and the base 216 of transistor 212. A resistor 222 is connected between node 224 at the base 226 of transistor 212 and node 226. A 115 cycle per second chopper 228 is provided with two fixed contacts 230 and 232 which are connected to node 226. A movable contact 234 is positioned between fixed contacts 230 and 232 and is connected through a multi-pole switch 236 to a terminal 238 connected to the negative side of the battery. A second transistor 240 includes an emitter 242 coupled to the collector 220 of transistor 212. A resistor 244 is connected between the emitter 242 and the base 246 of the transistor 240. A Zener diode 247 is connected between the base 246 and the collector 248 of transistor 240. A diode 250, in series with a resistor 252, is provided between node 254 at the base 246 of transistor 240 and the node 226. The collector 248 of transistor 240 is connected to one side of the primary coil 254 of a step-up transformer 256. The other side of the primary coil 254 is coupled to the negative terminal 238 of the power supply through the multi-pole switch 236. The secondary winding 258 of transformer 256 is connected to a selenium rectifier 260 which is coupled to an output terminal 262. A filtering capacitor 264 is connected between the output probe 262 and ground. The secondary coil 258 of transformer 256 is also connected through multi-pole switch 236 to terminal 238 of the power supply. Selenium rectifier 260 has a polarity so as to produce positive voltage at the output 262.

The second loop of the power supply circuit is substantially identical to the first and includes transistors 270 and 272 which are base connected to a chopper 274 and to the primary of a transformer 276. The polarity of the connection to the primary winding is reversed from that of the transformer 256 and the high voltage output of the transformer 276 is coupled to a selenium rectifier 278 which has a polarity so as to produce a negative output at terminal 280. It will be appreciated that various output configurations including full- and half-wave rectifier circuits may be used to produce the positive and neagtive output values.

The operation of the circuit may be described as follows: With switch 236 in a closed position, coil 229 of chopper 228 is energized through resistors 222 and 214 to the power supply. With the coil 229 energized, the movable contact 234 completes a circuit with fixed contact 232 thereby shunting the coil 229. This increases the negative voltage applied to the bases 216 and 246 of transistors 212 and 240 and renders them conductive. With the coil 229 deenergized movable contact 234 is released from fixed contact 232 and the cycle is repeated with the fixed contact 230 and movable contact 234 shunting the coil 229. The rapid rendering of the transistors 212 and 240 conductive and non-conductive produces an output from transistor 240 having a step wave configuration. The transformer 256 sees this wave train as an AC signal and transforms it to a high voltage value. The output of transformer 256 is then rectified by selenium rectifier 260 and appears at output 262 as a high voltage DC potential. The second loop of the power supply circuit operates in the same manner through transistors 270 and 272, chopper 274 and transformer 276 to supply a high voltage output which is rectified by selenium rectifier 278 and appears at output 280 as a high voltage DC negative potential.

It will be appreciated that the above description is illustrative only and not limiting and many modifications may be made to the specific embodiment described above without departing from the spirit and scope of the invention.

What is claimed is:

1. In combination with electro-static crop dusting apparatus, an ionization chamber comprising a means defining an air stream duct for providing an air stream flow, a venturi nozzle mounted within said duct in said air stream flow, a means defining an inlet for providing crop dusting material into said venturi nozzle, a first electrode juxtaposed to said venturi nozzle in said air stream flow, said duct defining means including a second electrode having a convex curved surface in the form of an ar foil, and means to apply a potential difference across said electrodes to charge said dusting material.

2. The ionization chamber of claim 1 wherein said first electrode is an elongated L shaped element positioned within said venturi nozzle having its end pointing parallel to said air stream flow, and said second electrode is a tapered cylinder havinng its rearward section surrounding said venturi nozzle.

3. The ionization chamber of claim 1 wherein said first electrode is an elongated rod positioned transversely to the opening of said venturi nozzle in said air stream flow and said second electrode comprises a pair of plates on opposite sides of said duct adjacent to the opening of said venturi nozzle.

4. In combination with an electrostatic crop dusting apparatus as recited in claim 1 wherein said means defining an air stream duct and said venturi nozzle includes means to cause a portion of said air stream flow to shield said second electrode from said crop dusting material.

5. An electrostatic crop dusting apparatus comprising means defining a duct open at both ends for passing an air stream therethrough, mixing means for mixing crop dusting material with air in the middle of said duct to be carried out of said duct by said air stream, a first electrode positioned in said duct in the path of said crop dusting material carried by said air stream, said crop dusting apparatus including a second electrode at the inner wall of said duct, said mixing means and said duct including means to cause a portion of said air stream to shield said second electrode from said crop dusting material, and means to apply a potential difference across said electrodes to charge said dusting material.

6. The apparatus of claim 5 wherein said mixing means comprises a tube positioned in the middle of said duct in a manner so that a portion of said air stream flows around said tube and adjacent to said second electrode to shield said second electrode from said crop dusting material.

7. The apparatus of claim 6 wherein said electrode defines a portion of the inner wall surface of said duct and has a convex curved surface in an air foil configuration.

8. In an electro-static crop dusting apparatus including a means defining an air flow duct, means to mix crop dusting material with air in said duct and an ionization chamber to charge said crop dusting material as it is carried by said air flow, wherein the improvement comprises a pair of electrodes for producing an ionization field in said chamber and means to provide a high positive voltage with respect to ground potential to one of said electrodes and a high negative voltage with respect to said ground potential to the other of said electrodes, one of said electrodes having a convex curved surface within said duct in an air foil configuration to reduce the tendency of charge particles to collect on its surface.

9. The electro-static crop dusting apparatus as recited in claim 8 where said one of said electrodes defines said duct and said means to mix crop dusting material with air comprises a venturi tube within said duct.

10. The electro-static crop dusting apparatus of claim 9 wherein said one of said electrodes is in the form of a tapered cylinder and the other of said electrodes is an L shaped element within said venturi tube having its end pointing parallel with the air and dusting material flow stream.

11. The electro-static crop dusting apparatus of claim 9 wherein said one of said electrodes comprises a pair of rectangular plates positioned on the opposite sides of said duct and wherein the other of said electrodes is a rod positioned across the end of said venturi tube.

12. In an electro-static crop dusting apparatus including a means defining an air flow duct, means to mix crop dusting material with air in said duct and an ionization chamber to charge said crop dusting material as it is carried by said air flow, wherein the improvement comprises a pair of electrodes for producing an ionization field in said chamber and means to provide a high positive voltage with respect to ground potential to one of said electrodes and a high negative voltage with respect to said ground potential to the other of said electrodes, said means defining an air flow duct and said means to mix crop dusting material with air including means to cause the portion of the air stream flowing through said duct to shield one of said electrodes from said crop dusting material.

13. In an electro-static crop dusting apparatus including a means defining an air flow duct, means to mix crop dusting material with air in said duct and an ionization chamber to charge said crop dusting material as it is carried by said air flow, wherein the improvement comprises a pair of electrodes for producing an ionization field in said chamber and means to provide a high positive voltage with respect to ground potential to one of said electrodes and a high negative voltage with respect to said ground potential to the other of said electrodes, said voltage providing means comprising a power supply having a pair of circuits, wherein one circuit produces high positive voltage output and the other circuit produces a high negative voltage output, each of said circuits including a chopper connected to a source of direct current having a vibrating element and a drive means therefor, a pair of switching devices capable of being rendered conducting or non-conducting in accordance with a bias voltage from said chopper, a transformer for receiving voltage pulses from said switching devices and a rectifier connected to the output of said transformer for producing a D.C. voltage.

References Cited

UNITED STATES PATENTS

| | | | |
|---|---|---|---|
| 1,723,955 | 8/1929 | Shepherd et al. | 317—3 X |
| 1,880,781 | 10/1932 | Cairns | 317—3 X |

(Other references on following page)

UNITED STATES PATENTS

| | | | |
|---|---|---|---|
| 2,890,388 | 6/1959 | Closkey et al. | 317—3 |
| 2,999,970 | 9/1961 | Schwesig et al. | 321—27 |
| 3,113,037 | 12/1963 | Watanabe | 239—3 X |
| 3,141,259 | 7/1964 | Winters | 239—15 X |
| 3,212,211 | 10/1965 | Bennett | 317—3 X |
| 3,297,281 | 1/1967 | Felici | 239—15 X |

J D MILLER, Primary Examiner

W. H. BEHA, Jr., Assistant Examiner

U.S. Cl. X.R.

239—15